United States Patent [19]

Torii et al.

[11] 4,111,848

[45] Sep. 5, 1978

[54] CATALYST FOR OXIDATION OF CARBON MONOXIDE AND HYDROCARBONS IN COMBUSTION ENGINE EXHAUST GAS

[75] Inventors: Shinkity Torii, Kanagawa; Sakae Kawagoshi, Yokohama; Tetsuhiko Yoneshige, Yokohama; Hidehumi Ito, Yokohama, all of Japan

[73] Assignee: Nissan Motor Company, Limited, Yokohama, Japan

[21] Appl. No.: 807,191

[22] Filed: Jun. 16, 1977

[30] Foreign Application Priority Data

Jun. 17, 1976 [JP] Japan .................................. 51-70352

[51] Int. Cl.$^2$ ......................... B01J 21/04; B01J 23/56
[52] U.S. Cl. ............................ 252/466 PT; 423/213.5
[58] Field of Search ................ 252/466 PT; 423/213.5

[56]  References Cited

U.S. PATENT DOCUMENTS

| 3,741,725 | 6/1973 | Graham ............................. 423/213.5 |
| 4,051,073 | 9/1977 | Hegedus et al. ................ 252/466 PT |

FOREIGN PATENT DOCUMENTS 1,033,641  7/1958  Fed. Rep. of Germany .... 252/466 PT Primary Examiner—W. J. Shine
Attorney, Agent, or Firm—Bacon & Thomas

[57]  ABSTRACT

A catalyst which consists essentially of a carrier of active alumina and, distributed upon the carrier, at least one catalytic metal selected from Pt, Pd, Rh and Ir and is produced by impregnating the carrier with an aqueous solution of thermally decomposable catalytic metal salt(s) and baking the impregnated carrier in 100% steam at 300°–600° C. The total amount of the catalytic metal(s) in the catalyst is 0.03–0.3 Wt%, and the amounts of Rh and Ir both are limited to 0–0.03 Wt%. The catalyst features a high conversion ability for hydrocarbons, good durability and a low activity on the conversion of $SO_2$ to $SO_3$ particularly when a combination of Pt and/or Pd, and either Rh or Ir is used as the catalytic metals.

10 Claims, 16 Drawing Figures

CATALYST FOR OXIDATION OF CARBON MONOXIDE AND HYDROCARBONS IN COMBUSTION ENGINE EXHAUST GAS

BACKGROUND OF THE INVENTION

This invention relates to a catalyst for the catalytic oxidation of carbon monoxide and hydrocarbons in the exhaust gas of combustion engines such as automotive internal combustion engines, which catalyst is of the type comprising a platinum group metal distributed upon an active alumina carrier.

In the art of reducing the emission of pollutants from combustion engines, particularly automotive internal combustion engines, into the atmosphere, the removal of carbon monoxide (CO) and unburned hydrocarbons (HC) from the exhaust gas is commonly accomplished by catalytic oxidation. At present, the most widely used catalytic substance for this purpose is the metals of the platinum group, being used either singularly or in combinations. A practical catalyst is given by impregnating or distributing the catalytic metal(s) upon a support or carrier which is made of active alumina typified by gamma alumina. Usually, this type of catalyst is produced by immersing the carrier in an aqueous solution of thermally decomposable compound(s), such as a halide or the like, of the catalytic metal(s), drying the wet carrier and then baking the solution-impregnated carrier to effect the pyrolysis of the compound(s). The baking is performed in hydrogen atmosphere in many cases and sometimes in air. This method and conventional catalysts produced by this method have the following disadvantages.

(1) The conversion ability of the catalysts for HC is not yet fully satisfactory. Besides, the catalysts suffer from insufficient durability: they exhibit a considerable lowering in the conversion ability by lapse of time not only when disposed in engine exhaust line but also during ordinary storage.

(2) The catalysts exhibit unwantedly potent catalytic activity on the conversion of sulfur dioxide $SO_2$ to more noxious sulfur trioxide (anhydrous sulfuric acid) $SO_3$.

(3) The use of hydrogen gas, which has a very wide range of explosion, renders the baking procedure complicated, troublesome and dangerous.

SUMMARY OF THE INVENTION

It is an object of the present invention to obviate these disadvantages of conventional exhaust gas conversion catalysts of the described type.

It is another object of the invention to provide an improved catalyst for the oxidation of HC and CO in exhaust gas of combustion engines, which catalyst is superior to the conventional catalysts both in the conversion ability in a fresh state and in the ability of long retaining its conversion ability.

It is a still another object of the invention to provide a catalyst for the described use, which catalyst exhibits an improved conversion ability for HC but is less active on the oxidation of $SO_2$ compared with conventional catalysts for the same use.

A catalyst according to the invention consists essentially of a carrier of active alumina and at least one catalytic metal selected from Pt, Pd, Rh and Ir, distributed upon the carrier. The total amount of the catalytic metal(s) in the carrier is from 0.03 to 0.3 Wt% with the limitation that both the amount of Rh and the amount of Ir are not larger than 0.03 Wt%. It is a requisite that the catalyst is produced by a method comprising the steps of impregnating the carrier with an aqueous solution of at least one thermally decomposable compound of Pt, Pd, Rh or Ir, and baking the impregnated carrier in a stream of substantially 100% steam at temperatures between 300° and 600° C.

It is greatly preferable that the catalyst contains at least one of Pt and Pd for achieving a high conversion percentage for HC. The addition of Rh and/or Ir to Pt and/or Pd is favorable for lowering the conversion activity on $SO_2$.

When Pt and Pd are jointly employed as the catalytic metals, it is preferable that the weight ratio Pt/Pd is between 9/1 and 1/9. For the combinations of Pd-Rh and Pd-Ir, the weight ratio Pd/Rh(or Ir) is preferably between 30/1 and 10/1. For the combinations of Pt-Rh and Pt-Ir, the weight ratio Pt/Rh(or Ir) is preferably between 100/1 and 10/1. For the combinations of Pt-Pd-Rh and Pt-Pd-Ir, the weight ratio (Rt + Pd)/Rh(or Ir) is preferably between 60/1 and 60/4.

Chloroplatinic acid, palladium chloride, rhodium trichloride and iridium tetrachloride are preferred as the compounds of the catalytic metals for the impregnation of the carrier.

DESCRIPTION OF PREFERRED EMBODIMENTS

Figure 1:
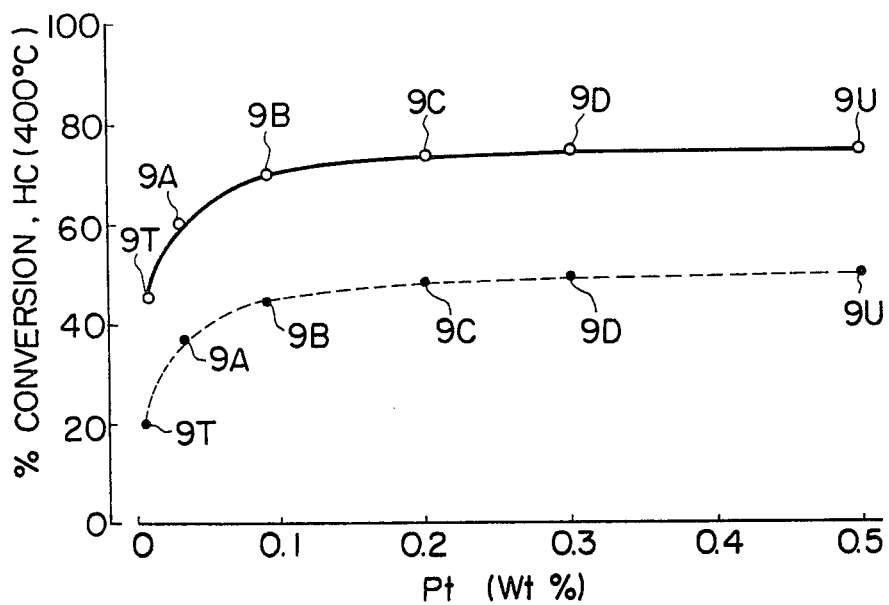
FIGS. 1-8 are graphs showing the dependence of the catalytic activity of a catalyst according to the invention on the amount of the total catalytic metal in the catalyst for eight different catalytic metal compositions, respectively.

A catalyst according to the invention utilizes a conventional support or carrier of active alumina, which is called also transient alumina and typified by gamma alumina. The carrier may take the form of grannules, or pellets, (e.g., of 1-5 mm) or may be monolithic (e.g., with honeycomb structure).

The impregnation of the carrier with an aqueous solution of the catalytic metal salt(s) is accomplished by, for example, immersing the carrier in the solution or rinsing the carrier with the solution as in the production of conventional catalysts of similar types. Preferably, the solution is made to be acidic by the addition of a small quantity of acid in advance of the introduction of the carrier, and the impregnation is performed at a solution temperature of 20°-60° C. After withdrawal from the solution, the carrier may be dried at about 100°-200° C to evaporate most of the impregnated water before the baking step.

The final baking step in substantially 100% steam is carried out at temperatures between 300° and 600° C for about 20-180 min. If the baking temperature is below 300° C, a resultant catalyst does not exhibit a satisfactorily high conversion ability for HC and CO. A lowering in the conversion ability tends to occur also when the baking temperature exceeds 600° C possibly because of an unfavorable influence of such a high temperature on a uniform distribution of the active catalytic metal(s) in the catalyst.

Improved conversion ability for HC of a catalyst according to the invention is greatly attributed to the employment of steam as the pyrolysis atmosphere in the production of the catalyst. The reason for the advantage of steam over hydrogen or air is considered as follows. Since the carrier is impregnated with at least one compound which contains chlorine other than the catalytic metal, chlorine is liberated by the baking of the impregnated carrier. Most of the liberated chlorine diffuses into the atmosphere in which the baking is performed, but a portion of the liberated chlorine is adsorbed by the carrier of active alumina. The presence of the thus adsorbed chlorine in the catalyst significantly and unfavorably influences the catalytic activity of the catalyst. When a steam stream is used as the baking atmosphere in place of a stream of hydrogen or air, a larger portion of the liberated chlorine is carried away in the stream, resulting in a decreased chlorine content of the catalyst. Even the use of a steam/air mixture is advantageous over the use of air or hydrogen, but the use of substantially 100% steam is the most effective in enhancing the conversion ability for HC and durability of the catalyst as demonstrated in the examples presented hereinafter.

Nevertheless, the baking in steam causes a lowering in the activity of the catalyst on the conversion of $SO_2$ compared with the baking in hydrogen as demonstrated also in the examples. Probably, this favorable difference between the steam atmosphere and hydrogen atmosphere is originated in differences in the particle size, distribution mode and/or crystal strains of the catalytic metal(s) deposited on the carrier. The occurrence of such differences is possible since the pyrolysis of the compound(s) on the carrier proceeds at different rates depending on the baking atmosphere.

Among the selected four catalytic metals Pt, Pd, Rh and Ir, both Pt and Pd can give a satisfactorily efficient oxidation catalyst for the treatment of a combustion engine exhaust gas even when used singularly. However, as seen in the examples, there is an inherent difference between Pt and Pd in the following respect.

(Pt) Pt exhibits a very high activity on the conversion of HC, but at the same time unfavorably catalyzes the oxidation of $SO_2$ with a considerably and unwantedly high efficiency.

(Pd) Pd is slightly inferior to Pt with regard to the conversion ability for HC but exhibits a considerably lower activity on the oxidation of $SO_2$ Accordingly it is advantageous to utilize Pt and Pd in combination as the catalytic metals in a catalyst according to the invention.

Neither Rh nor Ir exhibits a satisfactorily high ability for the conversion of HC and CO unless utilized together with either Pt or Pd. However, a catalyst containing Rh or Ir, or both, in addition to Pt and/or Pd is quite satisfactory both in a high ability of converting HC and in a low activity on the conversion of $SO_2$.

In the present invention, therefore, it is especially preferred to select the composition of the catalytic metals from the following eight kinds: Pt alone, Pd alone, Pt-Pd, Pt-Pd-Rh, Pt-Rh, Pt-Ir, Pd-Rh and Rd-Ir.

The total amount of the catalytic metal(s) in a catalyst according to the invention must be 0.03 Wt% at the smallest since the conversion ability is insufficient if this amount is less than 0.03%. It is practically meaningless and unprofitable to increase the amount of the total catalytic metal(s) to more than 0.3 Wt% since the increase causes little enhancement of the conversion ability. Consequently, a catalyst according to the invention in the most preferred form consists essentially of the described carrier, 0–0.3 Wt% Pt, 0–0.3 Wt% Pd, and either 0–0.03 Wt% Rh or 0–0.03 Wt% Ir, on condition that Pt and/or Pd is present in an amount not smaller than (a) 0.03 Wt% when neither of Rh and Ir is present or (b) 0.03 × 10/11 (= about 0.0273) Wt% when either Rh or Ir is present. When Rh or Ir is employed (together with Pt and/or Pd), it is desirable, with consideration of the conversion ability of the catalyst for HC, that the amount of Rh or Ir is limited to 0.03 Wt% at the most and that the weight ratio of Pt and/or Pt to either Rh or Ir is as specified hereinbefore.

The invention will be illustrated by the following examples, supplemented by comparative references.

EXAMPLE 1

An aqueous solution of chloroplatinic acid $H_2(PtCl_6)\cdot 6H_2O$ was prepared in such a concentration that 0.63 g of platinum was contained in 2.8 liters of this solution. The pH of this solution was adjusted to 2.0 by the addition of hydrochloric acid, and then the temperature of the solution was raised to 40° C. At this temperature, one liter (weighed 670 g) of a granular carrier of gamma alumina was impregnated with this solution (using 2.8 liters) in an impregnation tower of a fluidized bed type. After the impregnation, the wet carrier was dried in a hot-air drier at about 150° C until the water content of the carrier reached about 5%. Then the dried carrier was heated in a stream of 100% steam at 550° C for 60 min to decompose the impregnated chloroplatinic acid. The total quantity of the steam passed over the carrier during the 60 min heating was about one liter in terms of the volume of water as the condensate of the entire steam.

A resultant catalyst, which will be referred to as catalyst 1B, contained 0.09 Wt% Pt.

REFERENCE 1

The procedures of Example 1 were repeated till the drying of the impregnated carrier. Four catalysts 1P, 1Q, 1R and 1S were produced by the employment of four different sets of heating conditions for the pyrolysis of chloroplatinic acid on the carrier.

Catalyst 1P: 550° C, 60 min, in a stream of 90/10 mixture of steam/air

Catalyst 1Q: 550° C, 60 min, in a stream of 10/90 mixture of steam/air

Catalyst 1R: 550° C, 180 min, in a hydrogen stream

Catalyst 1S: 550° C, 90 min, in a stream of air

These catalysts 1P, LQ, 1R and 1S commonly contained 0.09 Wt% Pt.

Test 1

The catalyst 1B produced in Example 1 and the four catalysts 1P - 1S of Reference 1 were individually tested in the following manner to examine their initial (soon after production) catalytic ability for the conversion of HC and CO in exhaust gas.

Each of these catalysts was packed in a standard reactor for the evaluation of exhaust gas conversion catalysts, and a simulated or synthetic exhaust gas of the following composition was heated and passed through the catalyst bed in the reactor at a volume hourly space velocity of 30,000 $hr^{-1}$.

| Synthetic Exhaust Gas | |
|---|---|
| $C_3H_8$: | 500 ppm |

-continued

| Synthetic Exhaust Gas | |
|---|---|
| CO: | 2 Vol% |
| $O_2$: | 2.5 Vol% |
| NO: | 1000 ppm |
| $CO_2$: | 12 Vol% |
| $H_2O$: | 10 Vol% |
| $N_2$: | balance |

The result of this test is presented in Table 1. The conversion percentage for HC (propane in this case) or CO is defined as the percentage of a concentration difference caused by passing the synthetic exhaust gas through the catalyst bed to the initial concentration of HC or CO in the exhaust gas (before the contact with the catalyst). The test was repeated at various exhaust gas temperatures since the conversion ability of the catalysts of this type depends on temperature. Table 1 shows the data obtained at an exhaust gas temperature of 400° C, which is a relatively low value as a combustion engine exhaust gas temperature: greater conversion percentages were observed at higher exhaust gas temperatures such as 500° C or 600° C.

Test 2

This test was an endurance test. Each of the catalysts (1B, and 1P - 1S) was disposed in a standard catalytic converter for endurance test, and the converter was attached to an automotive gasoline engine. This engine was subjected to a usual bench test to accomplish an endurance run corresponding to a vehicle travel distance of 30,000 km, using a leadless gasoline and a lubricating oil containing very little impurities.

After the endurance run, the conversion ability of each eatalyst was measured in the same manner as in Test 1. The result of Test 2 for the five kinds of catalysts too are presented in Table 1.

The following Examples 2-4 were different from Example 1 in the kind of the catalytic metal but employed the same carrier, pH-adjustment of solution, impregnation method and baking method as Example 1 did. The correspondency of References 2-4 respectively to Examples 2-4 was the same as the correspondency of Reference 1 to Example 1. Table 1 contains the results of Tests 1 and 2 for the catalysts of Examples 2-4 and References 2-4 too.

EXAMPLE 2

An aqueous solution of palladium chloride $PdCl_2$, containing 0.63 g of Pd in 2.8 liters, was used for the impregnation of the carrier. This Example gave a catalyst 2B which contained 0.09 Wt% Pd.

REFERENCE 2

Four catalysts 2P, 2Q, 2R and 2S, all containing 0.09 Wt% Pd, were produced by varying the baking condition as in Reference 1. (The letters P, Q, R and S in the symbols for the catalysts respectivly imply 90/10 steam-/air mixture, 10/90 steam/air mixture, hydrogen and air as the baking atmosphere. Catalysts produced in the subsequent references too are symbolized in the same meaning.)

EXAMPLE 3

An aqueous solution of chloroplatinic acid and palladium chloride, containing 0.63 g of Pt and Pd (in total) per 2.8 liters, was used for the impregnation of the carrier. A catalyst 3B of this example contained 0.081 Wt% Pt and 0.009 Wt% Pd (the total amount of the catalytic metals was 0.09 Wt% and the weight ratio Pt/Pd was 9/1).

REFERENCE 3

This reference gave four catalysts 3P, 3Q, 3R and 3S, which commonly contained 0.081 Wt% Pt and 0.009 Wt% Pd.

EXAMPLE 4

An aqueous solution of chloroplatinic acid, palladium chloride and rhodium trichloride $RhCl_3 \cdot 4H_2O$, containing 0.63 g of Pt, Pd and Rh (in total) per 2.8 liters in such a proportion that the weight ratio Pt:Pd:Rh was 43:17:4, was used for the impregnation of the carrier. A catalyst 4B of this example contained 0.0602 Wt% Pt, 0.0238 Wt% Pd and 0.0056 Wt% Rh (the total amount of the catalytic metals was 0.09 Wt%).

REFERENCE 4

This reference gave four catalysts 4P, 4Q, 4R and 4S, which contained Pt, Pd and Rh in the same amounts as the catalyst 4B of Example 4.

Table 1

| Cata-lyst | Baking Atmosphere | % Conversion (400° C) | | | |
|---|---|---|---|---|---|
| | | initially | | after endurance run | |
| | | HC | CO | HC | CO |
| 1B | 100% steam | 70.0 | 99.0 | 44.0 | 97.0 |
| 1P | 90% steam | 52.0 | 97.0 | 31.5 | 94.5 |
| 1Q | 10% steam | 45.0 | 96.5 | 23.0 | 90.0 |
| 1R | hydrogen | 55.0 | 97.0 | 32.0 | 95.0 |
| 1S | air | 39.5 | 95.0 | 17.5 | 88.5 |
| 2B | 100% steam | 59.0 | 99.0 | 40.0 | 97.5 |
| 2P | 90% steam | 48.0 | 97.5 | 28.5 | 94.0 |
| 2Q | 10% steam | 42.0 | 96.0 | 21.5 | 90.0 |
| 2R | hydrogen | 50.5 | 97.0 | 30.5 | 94.5 |
| 2S | air | 38.5 | 97.0 | 20.5 | 90.0 |
| 3B | 100% steam | 68.5 | 99.0 | 42.5 | 97.0 |
| 3P | 90% steam | 54.0 | 98.0 | 35.0 | 95.0 |
| 3Q | 10% steam | 49.0 | 96.5 | 25.5 | 88.5 |
| 3R | hydrogen | 55.0 | 97.0 | 36.5 | 95.5 |
| 3S | air | 39.0 | 93.5 | 17.0 | 87.5 |
| 4B | 100% steam | 70.0 | 99.0 | 43.0 | 97.0 |
| 4P | 90% steam | 51.5 | 98.0 | 24.0 | 94.0 |
| 4Q | 10% steam | 47.5 | 96.5 | 20.5 | 89.0 |
| 4R | hydrogen | 52.5 | 97.0 | 25.0 | 95.0 |
| 4S | air | 37.5 | 93.5 | 17.5 | 87.0 |

The following Examples 5-8 demonstrate a joint use of rhodium or iridium with either platinum or palladium. References 5-8 correspond respectively to Examples 5-8 in the same way as Reference 1 to Example 1. The catalysts in these examples were produced by the method of Example 1 except that differently composed metal-salt solutions were used.

EXAMPLE 5

Using an aqueous solution of palladium chloride and rhodium trichloride, which contained 0.63 g of Pd and Rh (in total) per 2.8 liters with a weight ratio Pd/Rh of 30/1, a catalyst 5B containing 0.081 Wt% Pd and 0.009 Wt% Rh was obtained (the total amount of the catalytic metals was 0.09 Wt%).

REFERENCE 5

Four catalysts 5P, 5Q, 5R and 5S, which contained the same amounts of Pd and Rh as the catalyst 5B, were produced by varying the baking condition as in Reference 1.

EXAMPLE 6

An aqueous solution of palladium chloride and iridium tetrachloride IrCl$_4$, containing 0.63 g of Pd and Ir (in total) per 2.8 liters with a weight ratio Pd/Ir of 30/1, was used for producing a catalyst 6B which contained 0.0861 Wt% Pd and 0.0029 Wt% Ir (the total amount of the catalytic metals was 0.09 Wt%).

REFERENCE 6

This reference gave four catalysts 6P, 6Q, 6R and 6S, which contained the same amounts of Pd and Ir as the catalyst 6B.

EXAMPLE 7

An aqueous solution of chloroplatinic acid and rhodium trichloride, containing 0.63 g of Pt and Rh (in total) per 2.8 liters with a weight ratio Pt/Rh of 30/1, was used for producing a catalyst 7B which contained 0.0860 Wt% Pt and 0.0029 Wt% Rh (the total amount of the catalytic metals was 0.09 Wt%).

REFERENCE 7

This reference gave four catalysts 7P, 7Q, 7R and 7S, which contained the same amounts of Pt and Rh as the catalyst 7B.

EXAMPLE 8

Iridium tetrachloride was used in place of rhodium trichloride in Example 7 such that the solution contained 0.63 g of Pt and Ir (in total) with a weight ratio Pt/Ir of 30/1. A resultant catalyst 8B contained 0.087 Wt% Pt and 0.003 Wt% Ir (the total amount of the catalytic metals was 0.09 Wt%).

REFERENCE 8

This reference gave four catalysts 8P, 8Q, 8R and 8S, which contained the same amounts of Pt and Ir as the catalyst 8B.

The conversion ability and durability of the catalysts of Examples 5-8 and References 5-8 were examined by individually subjecting these catalysts to Tests 1 and 2. The results are presented in Table 2.

Table 2

| Catalyst | Baking Atmosphere | % Conversion (400° C) | | | |
|---|---|---|---|---|---|
| | | initially | | after endurance run | |
| | | HC | CO | HC | CO |
| 5B | 100% steam | 62.0 | 99.0 | 41.0 | 97.0 |
| 5P | 90% steam | 49.0 | 98.0 | 26.0 | 94.0 |
| 5Q | 10% steam | 40.5 | 93.5 | 19.5 | 89.0 |
| 5R | hydrogen | 50.0 | 98.0 | 27.0 | 95.0 |
| 5S | air | 36.5 | 92.0 | 19.0 | 86.5 |
| 6B | 100% steam | 63.0 | 99.0 | 50.5 | 97.0 |
| 6P | 90% steam | 48.0 | 97.0 | 27.0 | 93.5 |
| 6Q | 10% steam | 42.5 | 93.0 | 21.5 | 90.0 |
| 6R | hydrogen | 49.0 | 96.0 | 29.0 | 94.0 |
| 6S | air | 40.0 | 92.5 | 21.5 | 89.0 |
| 7B | 100% steam | 67.5 | 99.0 | 42.5 | 97.0 |
| 7P | 90% steam | 53.0 | 98.0 | 34.0 | 95.0 |
| 7Q | 10% steam | 48.0 | 96.5 | 24.5 | 88.5 |
| 7R | hydrogen | 54.5 | 97.0 | 35.5 | 95.5 |
| 7S | air | 37.0 | 93.5 | 17.0 | 87.5 |
| 8B | 100% steam | 66.0 | 99.0 | 40.5 | 97.0 |
| 8P | 90% steam | 51.0 | 98.0 | 30.0 | 95.0 |
| 8Q | 10% steam | 47.0 | 96.0 | 23.5 | 88.0 |
| 8R | hydrogen | 53.5 | 97.5 | 33.0 | 95.0 |
| 8S | air | 36.0 | 93.5 | 16.0 | 87.0 |

The following Examples 9-16 and References 9-16 corresponding thereto demonstrate the dependence of the catalytic activity of catalysts of the above described type on the total amount of catalytic metal(s) in the individual catalysts and, for catalysts containing two or three kinds of catalytic metals, relative amounts of the respective metals in the catalysts. The production method shown in Example 1 was employed in these Examples 9-16 and References 9-16 aside from the composition of an aqueous solution for the impregnation of the carrier, but the total quantity of the steam passed over the carrier during the 60 min baking at 550° C. was increased to 5 liters (in terms of the volume of water as the condensate of the entire steam).

EXAMPLE 9

Four kinds of catalysts 9A, 9B, 9C and 9D were produced using four differently concentrated solutions of chloroplatinic acid, which contained 0.21 g, 0.63 g, 1.41 g and 2.11 g of Pt per 2.8 liters, respectively. These catalysts contained Pt in the following amounts.
9A: 0.03 Wt% — 9C: 0.2 Wt%
9B: 0.09 Wt% — 9D: 0.3 Wt%

REFERENCE 9

Two catalysts 9T and 9U were produced using two differently concentrated solutions of chloroplatinic acid, one containing 0.07 g of Pt in 2.8 liters and the other 3.5 g of Pt in 2.8 liters. The amounts of Pt in these catalysts were as follows.
9T: 0.01 Wt% — 9U: 0.5 Wt%

Throughout Examples 10-16, the total amount of the catalytic metal(s) in the individual catalysts was made to be 0.03 Wt%, 0.09 Wt%, 0.2 Wt% or 0.3 Wt% by making the concentration of the total catalytic metals(s) in the solutions of the catalytic metal salt(s) 0.21 g, 0.63 g, 1.41 g or 2.11 g per 2.8 liters. Throughout References 10-16, the total amount of the catalytic metal(s) in the individual catalysts was made to be 0.01 Wt% or 0.5 Wt% by making the concentration of the total catalytic metal(s) in the solutions of the catalytic metal salt(s) 0.07 g or 3.5 g per 2.8 liters.

EXAMPLE 10

Four kinds of catalysts 10A, 10B, 10C and 10D, all containing Pd as the catalytic metal, were produced by the use of palladium chloride as the catalytic metal salt.
10A: 0.03 Wt% Pd 10B: 0.09 Wt% Pd
10C: 0.2 Wt% Pd 10D: 0.3 Wt% Pd

REFERENCE 10

Catalysts 10T and 10U were produced using palladium chloride.
10T: 0.01 Wt% Pd — 10U: 0.5 Wt% Pd

EXAMPLE 11

Four catalysts 11A, 11B, 11C and 11D, all containing Pt and Pd with a weight ratio of Pt/Pd of 9/1 (in the solutions) and four catalysts 11E, 11F, 11G and 11H, which contained Pt and Pd with a weight ratio Pt/Pd of 1/9 (in the solutions) were produced by the use of eight differently prepared aqueous solutions, all containing both chloroplatinic acid and palladium chloride.
11A(0.03%): Pt=0.027 Wt%, Pd=0.003 Wt% (9/1)
11B(0.09%): Pt=0.081 Wt%, Pd=0.009 Wt% (9/1)
11C(0.2%): Pt=0.180 Wt%, Pd=0.021 Wt% (9/1)
11D(0.3%): Pt=0.271 Wt%, Pd=0.031 Wt% (9/1)
11E(0.03%): Pt=0.003 Wt%, Pd=0.027 Wt% (1/9)
11F(0.09%): Pt=0.009 Wt%, Pd=0.081 Wt% (1/9)
11G(0.2%): Pt=0.021 Wt%, Pd=0.181 Wt% (1/9)
11H(0.3%): Pt=0.031 Wt%, Pd=0.270 Wt% (1/9)

REFERENCE 11

Catalyst 11T(0.01%): Pt=0.009 Wt%, Pd=0.001 Wt% (9/1)
Catalyst 11U(0.5%): Pt=0.450 Wt%, Pd=0.050 Wt% (9/1)
Catalyst 11V(0.01%): Pt=0.001 Wt%, Pd=0.009 Wt% (1/9)
Catalyst 11W(0.5%): Pt=0.050 Wt%, Pd=0.450 Wt% (1/9)

EXAMPLE 12

For catalysts 12A, 12B, 12C and 12D all containing Pt, Pd and Rh with a weight ratio Pt:Pd:Rh of 43:17:4 (in the solutions), and four catalysts 12E, 12F, 12G and 12H, which contained Pt, Pd and Rh with a weight ratio Pt:Pd:Rh of 43:17:1 (in the solutions), were produced by the use of solutions containing chloroplatinic acid, palladium chloride and rhodium trichloride.

12A(0.03%): Pt=0.0204 Wt%, Pd=0.0081 Wt%, Rh=0.0019 Wt% (43:17:4)
12B(0.09%): Pt=0.0602 Wt%, Pd=0.0238 Wt%, Rh=0.0056 Wt% (43:17:4)
12C(0.2%): Pt=0.1344 Wt%, Pd=0.0531 Wt%, Rh=0.0125 Wt% (43:17:4)
12D(0.3%): Pt=0.2032 Wt%, Pd=0.0803 Wt%, Rh=0.0189 Wt% (43:17:4)
12E(0.30%): Pt=0.0215 Wt%, Pd=0.0085 Wt%, Rh=0.0005 Wt% (43:17:1)
12F(0.09%): Pt=0.0645 Wt%, Pd=0.0255 Wt%, Rh=0.0015 Wt% (43:17:1)
12G(0.2%): Pt=0.1420 Wt%, Pd=0.0560 Wt%, Rh=0.0033 Wt% (43:17:1)
12H(0.3%): Pt=0.2100 Wt%, Pd=0.0830 Wt%, Rh=0.0049 Wt% (43:17:1)

REFERENCE 12

Catalyst 12T(0.01%): Pt=0.0065 Wt%, Pd=0.0026 Wt%, Rh=0.0006 Wt% (43:17:4)
Catalyst 12U(0.5%): Pt=0.3365 Wt%, Pd=0.1330 Wt%, Rh=0.0313 Wt% (43:17:4)
Catalyst 12V(0.01%): Pt=0.0070 Wt%, Pd=0.0029 Wt%, Rh=0.0002 Wt% (43:17:1)
Catalyst 12W(0.5%): Pt=0.3530 Wt%, Pd=0.1390 Wt%, Rh=0.0082 Wt% (43:17:1)

EXAMPLE 13

Four catalysts 13A, 13B, 13C and 13D, all containing Pd and Rh with a weight ratio Pd/Rh of 30/1 (in the solutions), and four catalysts 13E, 13F, 13G and 13H which contained Pd and Rh with a weight ratio Pd/Rh of 10/1 were produced by the use of palladium chloride and rhodium trichloride.

13A(0.03%): Pd=0.0310 Wt%, Rh=0.0010 Wt% (30/1)
13B(0.09%): Pd=0.0901 Wt%, Rh=0.0030 Wt% (30/1)
13C(0.2%): Pd=0.1950 Wt%, Rh=0.0065 Wt% (30/1)
13D(0.3%): Pd=0.2900 Wt%, Rh=0.0097 Wt% (30/1)
13E(0.03%): Pd=0.0273 Wt%, Rh=0.0027 Wt% (10/1)
13F(0.09%): Pd=0.0822 Wt%, Rh=0.0082 Wt% (10/1)
13G(0.2%): Pd=0.1818 Wt%, Rh=0.0182 Wt% (10/1)
13H(0.3%): Pd=0.2730 Wt%, Rh=0.0273 Wt% (10/1)

REFERENCE 13

Catalyst 13T(0.01%): Pd=0.0095 Wt%, Rh=0.0003 Wt% — (30/1)
Catalyst 13U(0.5%): Pd=0.4840 Wt%, Rh=0.0160 Wt% — (30/1)
Catalyst 13V(0.010%): Pd=0.0105 Wt%, Rh=0.0010 Wt% — (10/1)
Catalyst 13W(0.5%): Pd=0.4600 Wt%, Rh=0.0450 Wt% — (10/1)

EXAMPLE 14

Four catalysts 14A–14D, all containing Pd and Ir with a weight ratio Pd/Ir of 30/1 (in the solutions), and four catalysts 14E–14H which contained Pd and Ir with a weight ratio Pd/Ir of 10/1 (in the solutions) were produced using palladium chloride and iridium tetrachloride.

14A(0.03%): Pd=0.0300 Wt%, Ir=0.0010 Wt% (30/1)
14B(0.09%): Pd=0.0871 Wt%, Ir=0.0029 Wt% (30/1)
14C(0.2%): Pd=0.1935 Wt%, Ir=0.0065 Wt% (30/1)
14D(0.3%): Pd=0.2900 Wt%, Ir=0.0097 Wt% (30/1)
14E(0.03%): Pd=0.0273 Wt%, Ir=0.0027 Wt% (10/1)
14F(0.09%): Pd=0.0815 Wt%, Ir=0.0082 Wt% (10/1)
14G(0.2%): Pd=0.1821 Wt%, Ir=0.0182 Wt% (10/1)
14H(0.3%): Pd=0.2730 Wt%, Ir=0.0273 Wt% (10/1)

REFERENCE 14

Catalysts 14T(0.01%): Pd=0.0094 Wt%, Ir=0.0003 Wt% — (30/1)
Catalyst 14U(0.5%): Pd=0.4830 Wt%, Ir=0.0160 Wt% — (30/1)
Catalyst 14V(0.01%): Pd=0.0091 Wt%, Ir=0.0009 Wt% — (10/1)
Catalyst 14W(0.5%): Pd=0.4560 Wt%, Ir=0.0455 Wt% — (10/1)

EXAMPLE 15

Four catalysts 15A–15D, which contained Pt and Rh with a weight ratio Pt/Rh of 30/1 (in the solutions), four catalysts 15E–15H with a weight ratio Pt/Rh of 10/1 (in the solutions) and four catalysts 15J, 15K, 15L and 15M with a weight ratio Pt/Rh of 100/1 (in the solutions) were produced by the use of chloroplatinic acid and rhodium trichloride.

15A(0.03%): Pt=0.0304 Wt%, Rh=0.0010 Wt% (30/1)
15B(0.09%): Pt=0.0881 Wt%, Rh=0.0029 Wt% (30/1)
15C(0.2%): Pt=0.1931 Wt%, Rh=0.0064 Wt% (30/1)
15D(0.3%): Pt=0.2872 Wt%, Rh=0.0096 Wt% (30/1)
15E(0.03%): Pt=0.0272 Wt%, Rh=0.0027 Wt% (10/1)
15F(0.09%): Pt=0.0810 Wt%, Rh=0.0082 Wt% (10/1)
15G(0.2%): Pt=0.1821 Wt%, Rh=0.0182 Wt% (10/1)
15H(0.3%): Pt=0.2733 Wt%, Rh=0.0273 Wt% (10/1)

15J(0.03%): Pt=0.0298 Wt%, Rh=0.0002 Wt% (100/1)
15K(0.09%): Pt=0.0897 Wt%, Rh=0.0009 Wt% (100/1)
15L(0.2%): Pt=0.1990 Wt%, Rh=0.0020 Wt% (100/1)
15M(0.3%): Pt=0.1980 Wt%, Rh=0.0030 Wt% (100/1)

REFERENCE 15

Catalyst 15T(0.01%): Pt=0.0099 Wt%, Rh=0.0003 — (30/1)
Catalyst 15U(0.5%): Pt=0.4820 Wt%, Rh=0.0160 Wt% — (30/1)
Catalyst 15V(0.01%): Pt=0.0090 Wt%, Rh=0.0009 Wt% — (10/1)
Catalyst 15W(0.5%): Pt=0.4550 Wt%, Rh=0.0454 Wt% — (10/1)
Catalyst 15X(0.01%): Pt=0.0102 Wt%, Rh=0.0001 Wt% — (100/1)
Catalyst 15Y(0.5%): Pt=0.5010 Wt%, Rh=0.0050 Wt% — (100/1)

EXAMPLE 16

Four catalysts 16A–16D which contained Pt and Ir with a weight ratio Pt/Ir of 30/1 (in the solutions), four catalysts 16E–16H with a weight ratio of Pt/Ir of 10/1 (in the solutions) and additionally four catalysts 16J–16M with a weight ratio of Pt/Ir of 100/1 (in the solutions) were produced by the use of chloroplatinic acid and iridium tetrachloride.

16A(0.03%): Pt=0.0300 Wt%, Ir=0.0010 Wt% (30/1)
16B(0.09%): Pt=0.0881 Wt%, Ir=0.0020 Wt% (30/1)
16C(0.2%): Pt=0.1930 Wt%, Ir=0.0062 Wt% (30/1)
16D(0.3%): Pt=0.2870 Wt%, Ir=0.0095 Wt% (30/1)
16E(0.03%): Pt=0.0270 Wt%, Ir=0.0027 Wt% (10/1)
16F(0.09%): Pt=0.0810 Wt%, Ir=0.0080 Wt% (10/1)
16G(0.2%): Pt=0.1820 Wt%, Ir=0.0181 Wt% (10/1)
16H(0.3%): Pt=0.2730 Wt%, Ir=0.0270 Wt% (10/1)
16J(0.03%): Pt=0.0298 Wt%, Ir=0.0003 Wt% (100/1)
16K(0.09%): Pt=0.0890 Wt%, Ir=0.0009 Wt% (100/1)
16L(0.2%): Pt=0.1990 Wt%, Ir=0.0020 Wt% (100/1)
16M(0.3%): Pt=0.2970 Wt%, Ir=0.0030 Wt% (100/1)

REFERENCE 16

Catalyst 16T(0.01%): Pt=0.0092 Wt%, Ir=0.0003 Wt% — (30/1)
Catalyst 16U(0.5%): Pt=0.4820 Wt%, Ir=0.0161 Wt% — (30/1)
Catalyst 16V(0.01%): Pt=0.0090 Wt%, Ir=0.0009 Wt% — (10/1)
Catalyst 16W(0.5%): Pt=0.4540 Wt%, Ir=0.0453 Wt% — (10/1)
Catalyst 16X(0.01%): Pt=0.0103 Wt%, Ir=0.0001 Wt% — (100/1)
Catalyst 16Y(0.5%) Pt=0.5100 Wt%, Ir=0.0050 Wt% — (100/1)

The catalysts of Examples 9–16 and References 9–16 were individually subjected to Tests 1 and 2 for examining their conversion ability for HC and CO at an exhaust gas temperature of 400° C. and durability.

Figure 2:
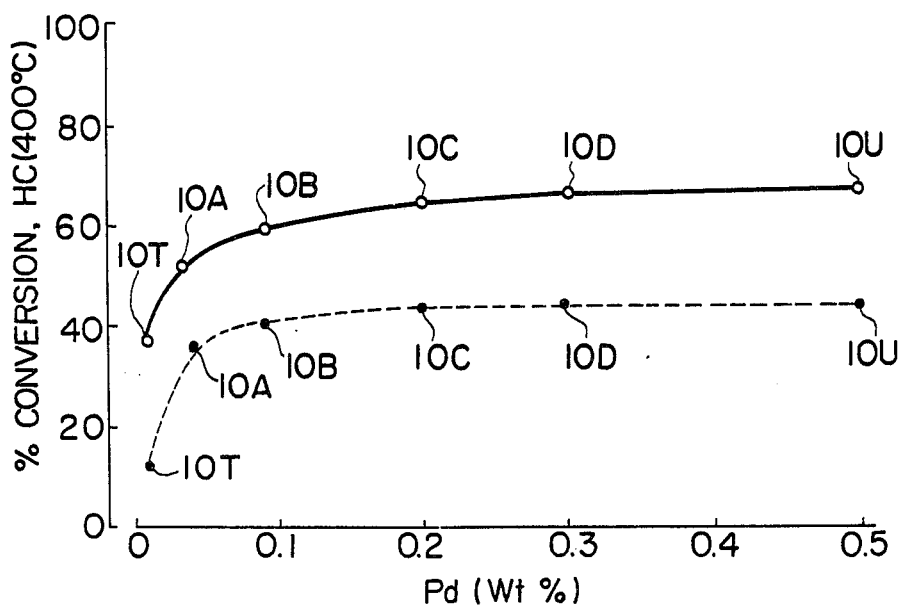
Figure 3:
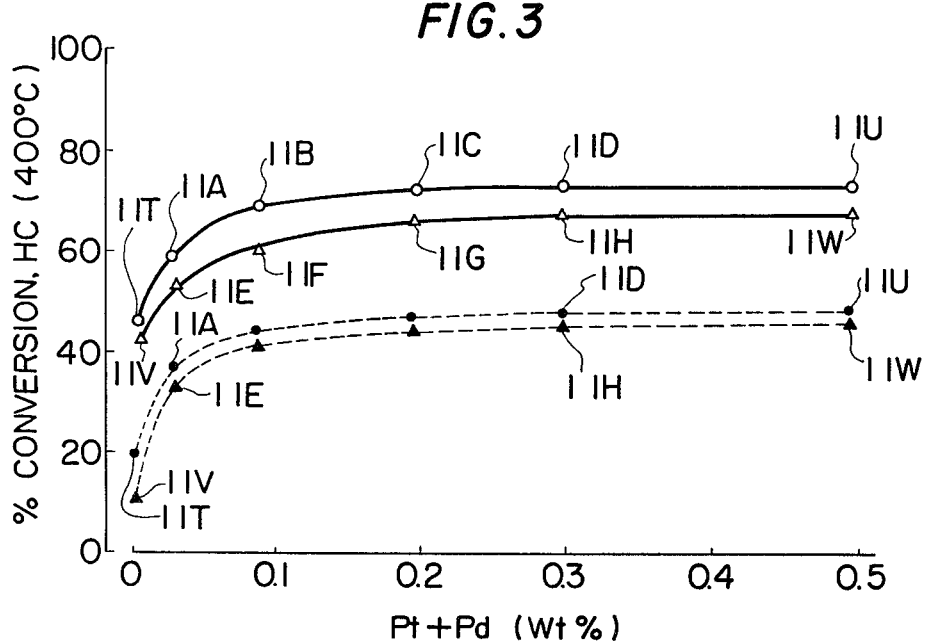
Figure 4:
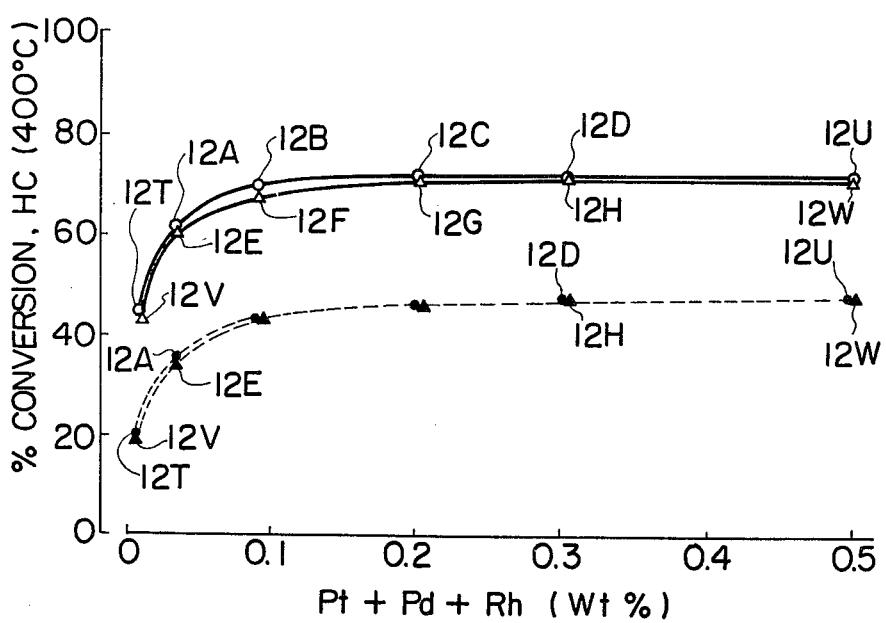
Figure 5:
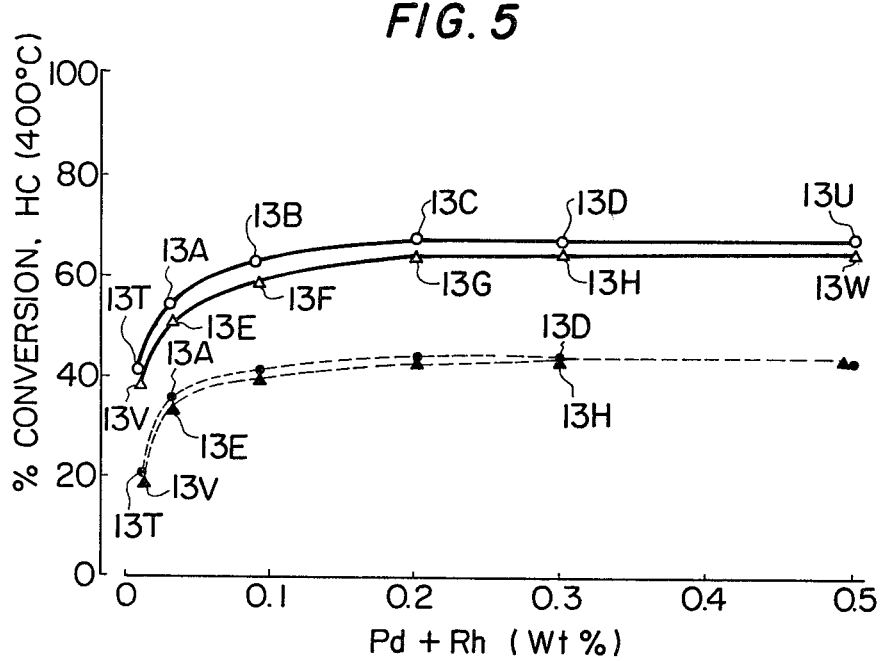
Figure 6:
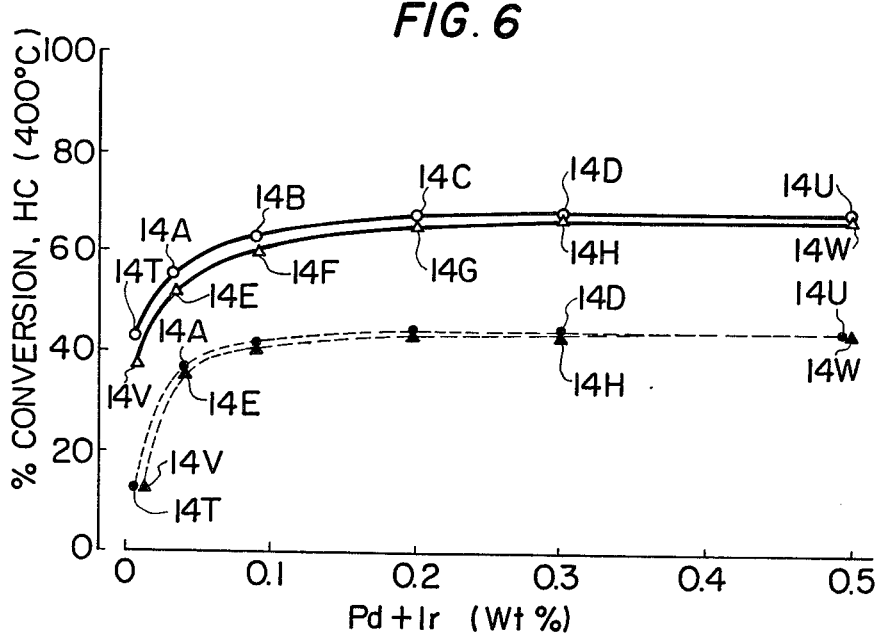
Figure 7:
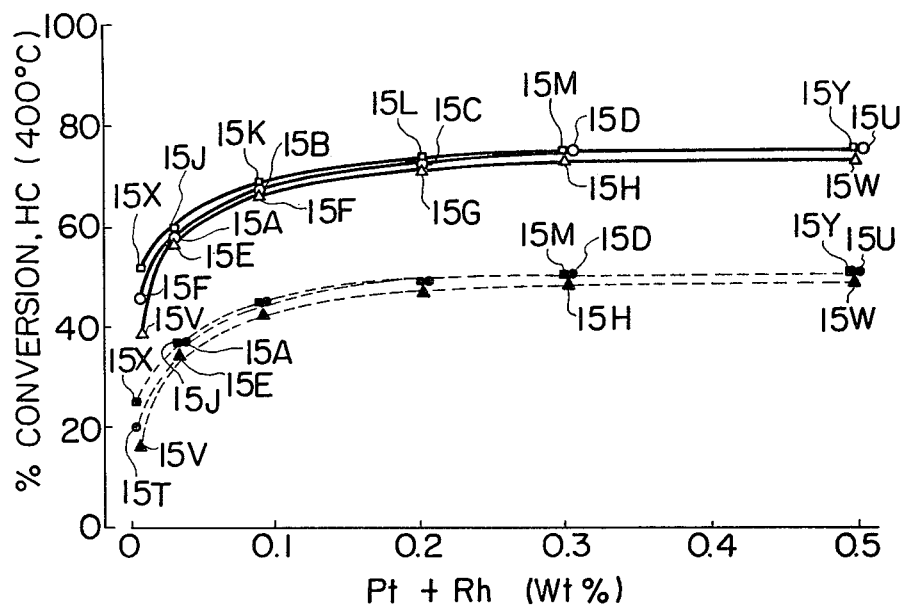
Figure 8:
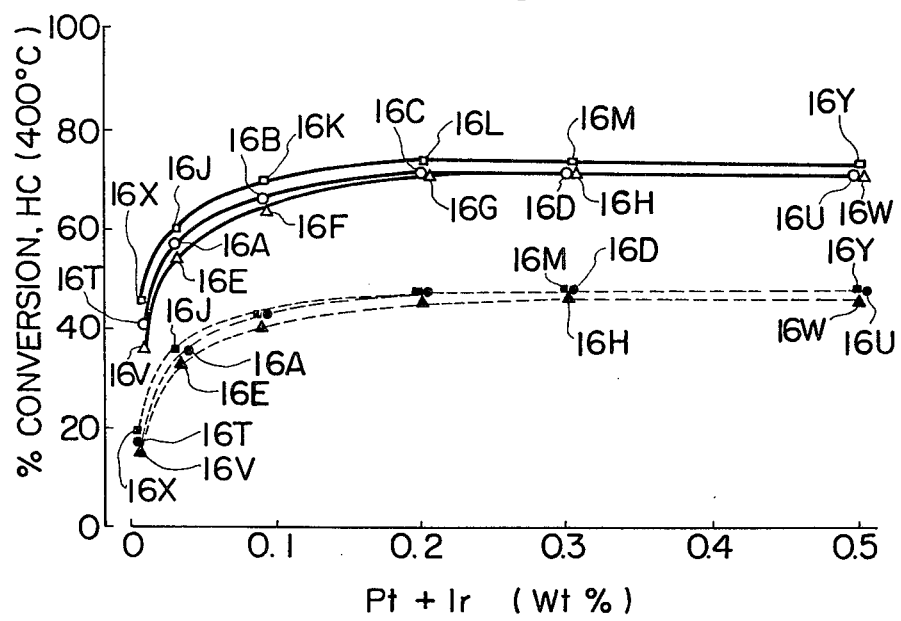

The conversion percentages for HC measured in these tests are graphically presented in FIGS. 1–8 as the function of the amount of the total catalytic metal(s) in each type of catalyst. In FIGS. 1–8, the curves of solid line represent the results of Test 1 (initial ability) and the curves of broken line Test 2 (after the endurance run).

The conversion percentages for CO measured in these tests on the catalysts of Examples 9–16 and References 9–16 are summarized in Table 3. There was no significant difference in the conversion percentage from example to example or reference to reference.

Table 3

| Total Amount of Catalytic Metal(s) in Catalyst | % Conversion for CO (400° C) | |
|---|---|---|
| | Test 1 | Test 2 |
| 0.01 Wt% (References 9–16) | 92.0 – 93.5 | 89.0 – 90.0 |
| 0.03 Wt% (Examples 9–16) | 98.0 – 99.5 | 96.5 – 98.0 |
| 0.09 Wt% (Examples 9–16) | 99.0 – 99.5 | 97.0 – 98.0 |
| 0.2 Wt% (Examples 9–16) | 99.0 – 99.5 | 97.0 – 98.5 |
| 0.3 Wt% (Examples 9–16) | 99.0 – 99.5 | 97.5 – 98.5 |
| 0.5 Wt% (References 9–16) | 99.0 – 99.5 | 97.0 – 99.5 |

Test 3

This test was performed for examining the $SO_2$-conversion(to $SO_3$) property of the catalysts produced in Examples 1–8. For comparison, the catalysts produced in References 1–8 through the baking in hydrogen atmosphere (symbolized by R) were tested as well.

Figure 9:
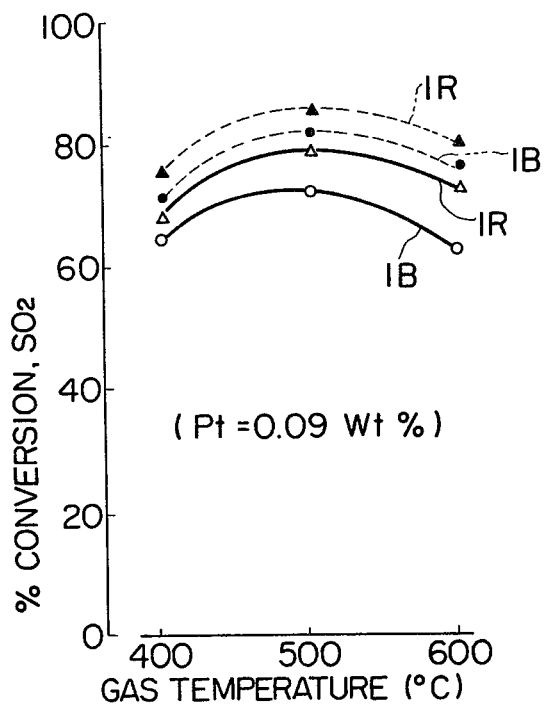
FIGS. 9-16 are graphs showing the catalytic activity on the conversion of $SO_2$ into $SO_3$ of a catalyst according to the invention as the function of temperature for eight different catalytic metal compositions, respectively.
Figure 10:
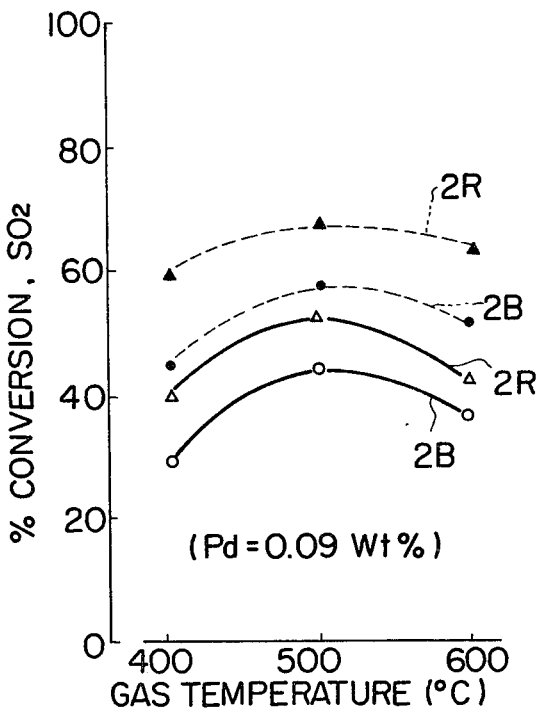
Figure 11:
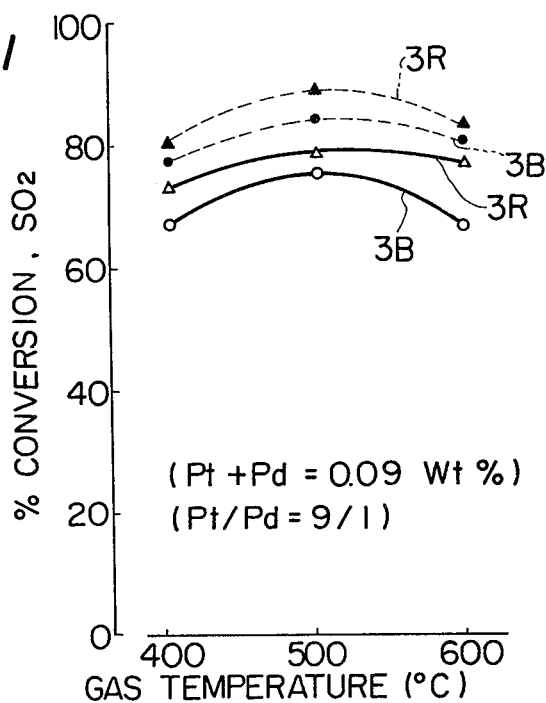
Figure 12:
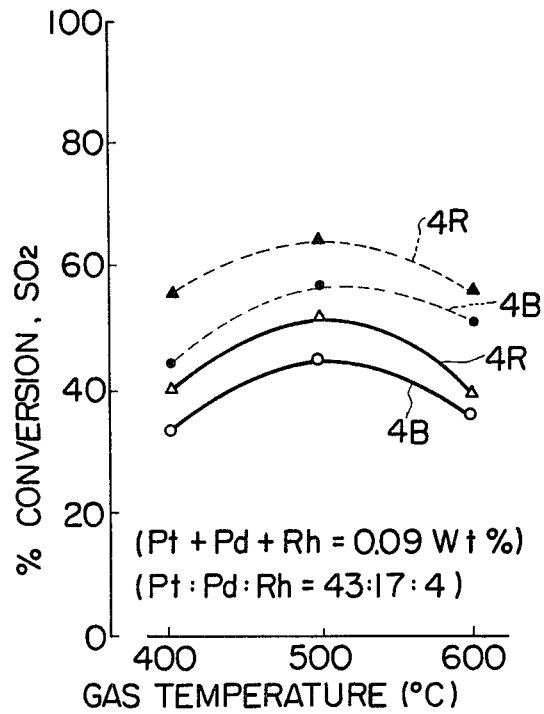
Figure 13:
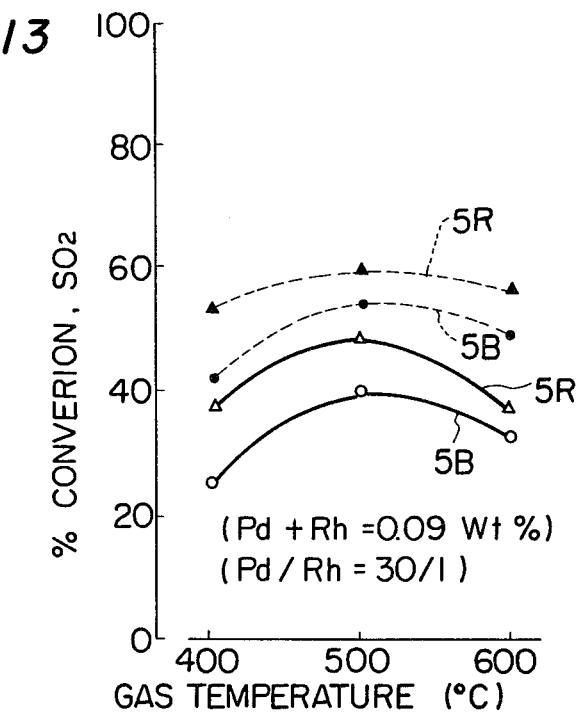
Figure 14:
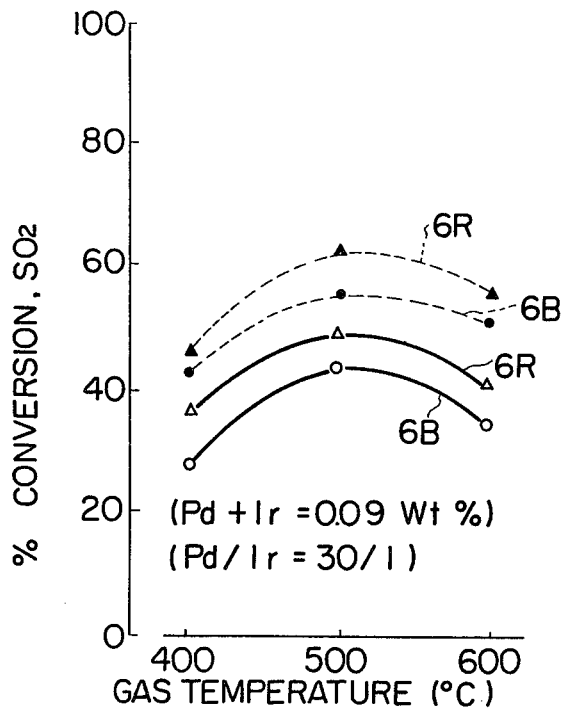
Figure 15:
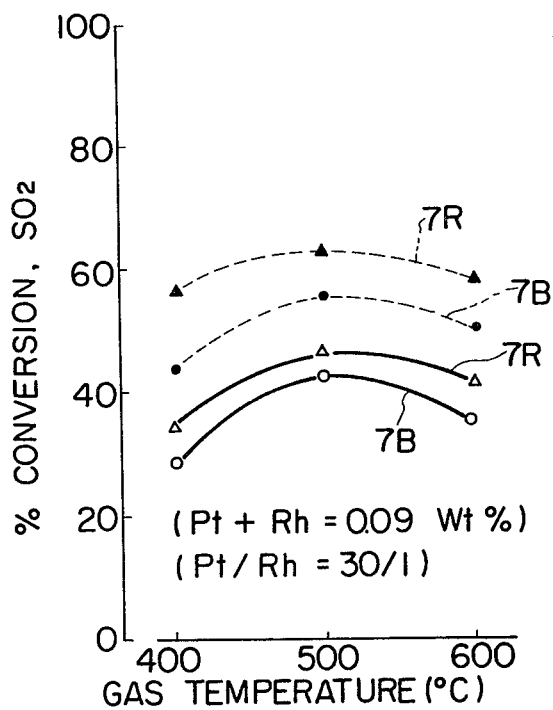
Figure 16:
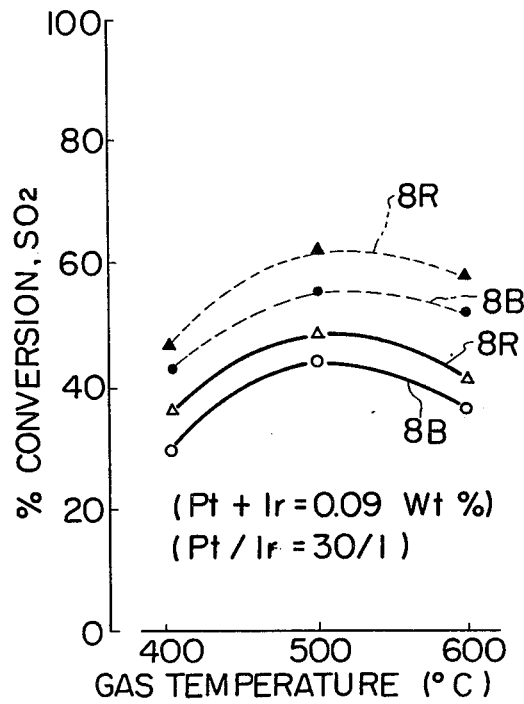

Each catalyst (20 ml) was packed in a reactor, and a gas mixture of the following composition was heated and passed through the reactor at a volume hourly space velocity of 30,000 $hr^{-1}$. The test was repeated by varying the gas temperature and incorporating the endurance run of Test 2. The results are graphically presented in FIGS. 9–16.

Gas Mixture $SO_2$: 40 ppm (measured by gas chromatograph)
CO: 2 Vol%
$O_2$: 4 Vol%
$N_2$: balance

What is claimed is:

1. A catalyst for conversion of carbon monoxide and hydrocarbons in the exhaust gas of a combustion engine, the catalyst consisting essentially of a carrier of active alumina and at least one catalytic metal which is selected from the group consisting of Pt, Pd, Rh and Ir and is distributed upon said carrier, the total amount of said at least one catalytic metal being in the range from 0.03 to 0.3 Wt% of the catalyst, both the amount of Rh and the amount of Ir being 0–0.03 Wt%, the catalyst being produced by a method comprising the steps of impregnating said carrier with an aqueous solution of at least one thermally decomposable compound of a catalytic metal selected from said group, and baking the impregnated carrier in a stream of substantially 100% steam at a temperature between 300° and 600° C.

2. A catalyst as claimed in claim 1, wherein said at least one thermally decomposable compound is selected from the group consisting of chloroplatinic acid, palladium chloride, rhodium trichloride and iridium tetrachloride.

3. A catalyst as claimed in claim 2, wherein said carrier comprises a granular form.

4. A catalyst as claimed in claim 2, wherein said at least one catalytic metal comprises Pt or Pd.

5. A catalyst as claimed in claim 2, wherein said at least one catalytic metal comprises Pt and Pd, the weight ratio of Pt to Pd being from 9:1 to 1:9.

6. A catalyst as claimed in claim 2, wherein said at least one catalytic metal comprises Pt, Pd and Rh, the weight ratio of the total of Pt and Pd to Rh being from 60:1 to 60:4.

7. A catalyst as claimed in claim 2, wherein said at least one catalytic metal comprises Pt and one of Rh and Ir, the weight ratio of Pt to Rh or Ir being from 100:1 to 10:1.

8. A catalyst as claimed in claim 2, wherein said at least one catalytic metal comprises Pd and one of Rh and Ir, the weight ratio of Pd to Rh or Ir being from 10:1 to 30:1.

9. A catalyst for conversion of carbon monoxide and hydrocarbons in a combustion engine exhaust gas, the catalyst consisting essentially of a carrier of active alumina and at least one catalytic metal which is distributed upon said carrier and comprises at least one of Pt and Pd, the total amount of Pt and Pd being from 0.0273 to 0.3 Wt% of the catalyst, 0–0.03 Wt% Rh and 0–0.03 Wt% Ir, the total amount of Pt, Pd, Rh and Ir being from 0.03 to 0.3 Wt% of the catalyst, the catalyst being produced by a method comprising the steps of impregnating said carrier with an aqueous solution containing at least one of chloroplatinic acid and palladium chloride, and, optionally depending on the amount of Rh and Ir in the catalyst, one of rhodium trichloride and iridium tetrachloride, and baking the impregnated carrier in a stream of substantially 100% steam at a temperature between 300° and 600° C.

10. The catalyst as claimed in claim 1, wherein said thermally decomposable compound of said catalytic metal comprises a chlorine-containing compound.

* * * * *